INVENTOR.
RALPH F. HERETH
BY
Seed & Berry

United States Patent Office 3,344,714
Patented Oct. 3, 1967

3,344,714
FLUID PRESSURE TRANSMISSION SYSTEM
Ralph F. Hereth, Tacoma, Wash., assignor to Wilkins & Associates, Inc., Tacoma, Wash., a corporation of Washington
Filed Oct. 5, 1964, Ser. No. 401,520
7 Claims. (Cl. 91—175)

The present invention relates in general to fluid transmission systems and more particularly to a system for accurately positioning one or a plurality of receivers or drive motors through a single fluid transmitter or control device. According to the present invention, a low torque source of power which may be manual, electric or fluid is used to selectively position a fluid transmitted for controlling the application of pressure fluid to one or a plurality of fluid motors or receivers for synchronizing the movement of the receiver or receivers which follow directly the positioning of the transmitter to a hold position. The transmitter unit of the system acts as a force transmitter rather than a displacement transmitter and hence receivers of any capacity may be utilized depending upon the torque requirements of the receivers, without effecting the force required to position the transmitter. In this system, accurate positioning can be obtained with the fluid system since leakage is of no consequence because the receivers will move to a given position and assume a hold position due to balancing of fluid pressure forces corresponding to the set position of the transmitter.

The primary object of the present invention is, therefore, to provide a fluid transmission system for positively synchronizing the movement and positioning of one or a plurality of motors or receivers through a single pressure fluid transmitter operable by an independent low torque power source.

Another object of the present invention is to provide a fluid transmission system of the character described that will positively synchronize the positioning of multiple receivers within the design torque capabilities of the receivers.

Another object of the present invention is to provide a fluid transmission system of the character described wherein the transmitter unit is remote from one or a plurality of receivers or drive assemblies and connected thereto by separate fluid transmission lines and wherein leakage in the fluid system is not a primary detriment to accuracy.

Yet another object of the present invention is to provide a fluid transmission system of the character described wherein one or a plurality of drive assemblies or receivers are controlled by a single remote fluid pressure transmitter for synchronized movement to a hold position through a balance of fluid pressures.

Other more particular objects and advantages of the invention will, with the foregoing, appear and be understood from the following description and claims, the invention consisting in the novel construction and adaptation and combination of parts hereinafter described and claimed. Reference is made now to the accompanying drawings, in which:

Figure 1:
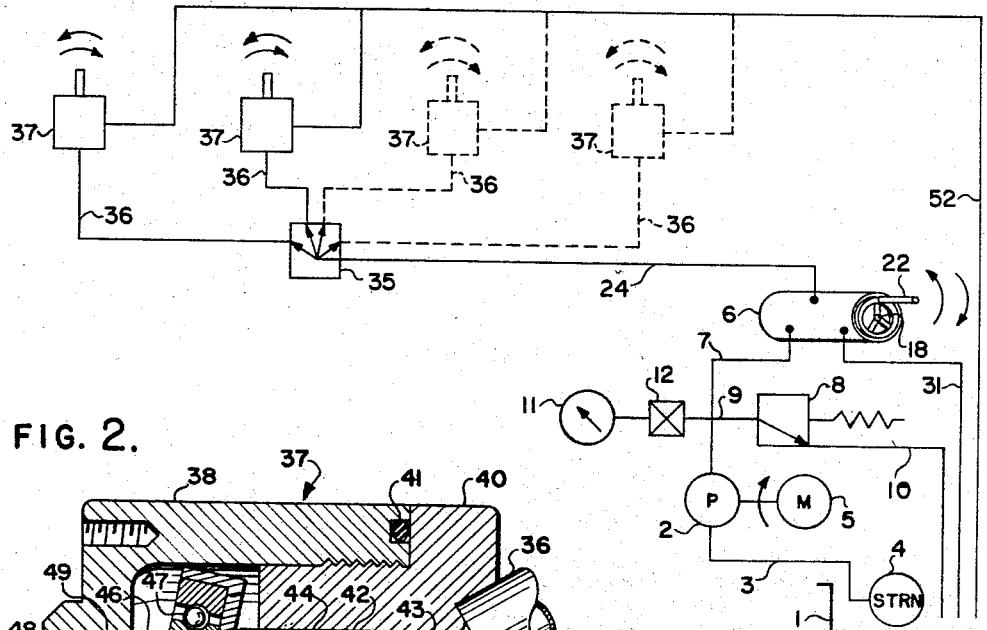
FIG. 1 is a schematic illustration of the fluid transmission system of the present invention.

Referring now to the drawings wherein like reference numerals indicate identical parts in the various views, the details of the fluid system will be described with primary reference to FIG. 1. While the present system will be described and illustrated in terms of a hydraulic system, it will be undersood that the system may be any fluid system within the customary definition of the term, viz., liquids, vapors and gases. Modifications necessary for operating the system from fluid pressure sources other than hydraulic will be apparent to those skilled in the art and such modifications are deemed to be within the scope of the present invention. The particular system illustrated includes a fluid reservoir 1 constituting a source of hydraulic fluid to which a pump 2 is connected through a suitable conduit 3 and a conventional strainer 4. The pump is driven by a prime mover such as the motor 5 which may be any conventional power unit such as an electric motor. The pump 2 delivers fluid under pressure to the transmitter unit 6 through a conduit 7. The pressure in the conduit 7 may be maintained at a preset value by means of an excess pressure release valve 8 connected to the conduit 7 by relief line 9 and to the reservoir 1 by a dump return line 10. A gauge 11 and a manual shut-off valve 12 may also be connected to the outlet side of the pump 2 for monitoring the fluid pressure in the line 7.

Figure 3:
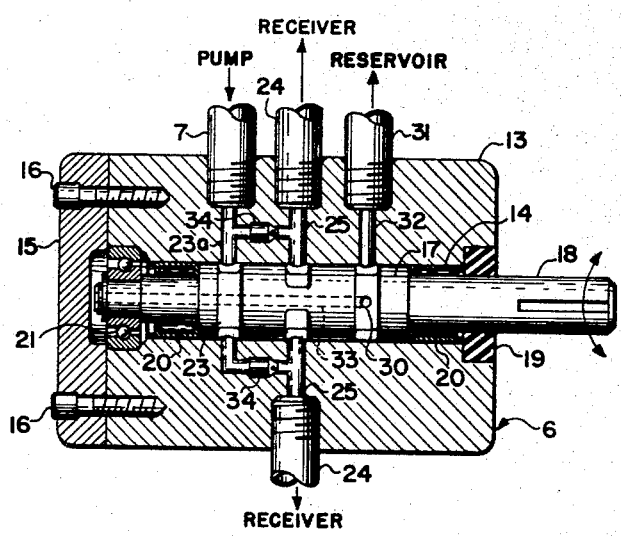
FIG. 3 is a cross sectional view of the fluid transmitter unit.

The transmitter 6 is illustrated in detail in FIG. 3 and constitutes a rotatable fluid valve assembly which includes a cylindrical valve housing 13 with a longitudinal cylindrical bore 14 and an end cap 15 secured to the housing 13 by means of cap screws 16. Any suitable means may be utilized to obtain a fluid tight seal between the housing 13 and the end cap 15 as will be understood by those skilled in the art. Mounted within the bore 14 is a rotatable valve spool 17 which includes an operating shaft 18 protruding from the end of the valve housing and provided with a fluid pressure seal 19. The valve spool 17 is supported for rotation within the valve housing by means of needle bearing assemblies 20 and a ball and race bearing assembly 21. As shown in FIG. 1, the spool shaft 18 may be rotated in either direction by any means such as a manually operated crank or the like 22. In the alternative, any power source such as a reversible electric motor may be used to rotatably position the valve spool 17 through the shaft 18.

Figure 4:
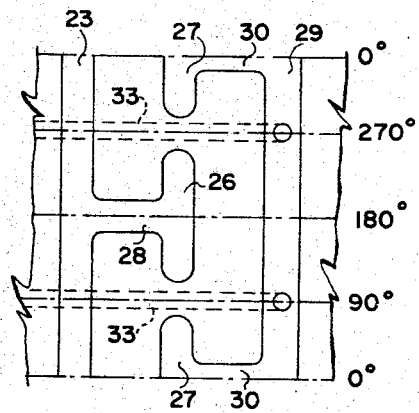
FIG. 4 represents a development of the spool shaft porting of the transmitter unit.

The spool valve porting may be understood from an inspection of FIG. 3 and the spool valve porting development shown in FIG. 4. The pressure fluid conduit 7 is connected to the valve housing by a suitable fitting and connects to an annular passage 23 in the spool 17 by means of the passage 23a. A plurality of transmission lines 24 are spaced around the valve housing and communicate with the bore 14 by means of passages 25. The number of transmission lines 24 in any particular system will depend upon the particular receiver or drive motor structure utilized and the number of transmission lines used will correspond to the exact number of fluid pressure lines required for operating a receiver unit. Since the number of transmission lines will vary, depending upon the particular system, the number of lines used will be referred to as N number of lines. The relationship between the transmission lines 24 and the receiver units will be presently described. It will also be noted that the transmission lines 24 will be equally spaced around the surface of the valve housing 13 for their cooperation with the valve spool configuration which will be understood as the specification progresses.

As may be seen from FIGS. 3 and 4, the valve spool is provided with two unconnected arcuate chambers 26 and 27 which are diametrically opposed on the surface of the valve spool and which are of equal arcuate extent. The chamber 26 communicates with the inlet passage 23 via the longitudinal passage 28. The chamber 26 is thus connected with the inlet conduit 7 and constitutes the high pressure chamber of the valve spool. The second arcuate chamber 27 communicates with the annular passage 29 via the longitudinal passage 30 and the passage 29 which in turn communicates with the return reservoir line 31 through the short passage 32 in the valve housing. The return line 31 leads to the reservoir 1 thus constituting the arcuate chamber 27 as the low pressure chamber of the valve spool. As will be understood from the foregoing description, rotation of the valve spool 17 by the shaft 18 alternately connects some of the adjacent transmission lines 24 with the high pressure chamber 26 and the others low pressure chamber 27.

In addition to the porting described, the spool 17 also includes an internal passage 33 which connects the outlet passage 29 with the bearing assembly 21 to protect the bearings from the high pressure fluid which is conventional in such valve arrangements. Each one of the passages 25 leading to the transmission lines 24 will also be connected to the high pressure passage 23a by means of a check valve 34 which functions to prevent locking of the receivers in a given set position, as will be understood from an explanation of the operation of the system which follows.

FIG. 1 illustrates the transmission lines 24 leading from the transmitter unit 6 to a fluid manifold 35 as a single line and it will be understood that the line 24 in FIG. 1 represents N number of lines depending upon the number of transmission lines connected to the transmitter unit as explained previously. The manifold 35 is shown only schematically in FIG. 1 since any manifold structure will suffice as long as it is constructed to receive N number of the transmission lines 24 from the transmitter 6 and to distribute the identical N number of fluid transmission lines 36 to each one of the receivers or drive assemblies 37 illustrated. Before describing the details of the receivers 37, it will be understood that one or any number of receiver units 37 may be utilized in any system according to the present invention and in case a plurality of reeceivers are utilized, the receiver units are preferably similar in structure in order to achieve ideal positive synchronization in positioning all of the receiver units.

Figure 2:
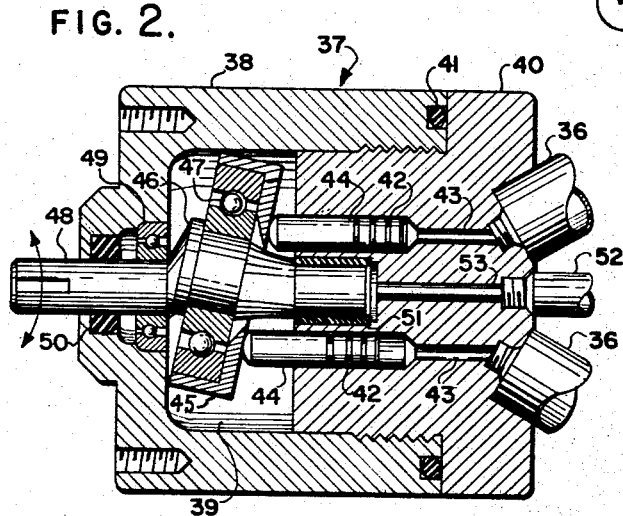
FIG. 2 is a cross sectional view of one of the receivers or drive assemblies utilized in the system.

One of the receiver units is illustrated in detail in FIG. 2, and in this instance, is represented as a conventional stationary barrel, wobble plate, fluid motor commonly known in the art. While no claim is made to details of the receiver unit per se, sufficient details will be described in order to enable an understanding of the function of the receiver within the present system. Referring to FIG. 2, the fluid motor includes a cylindrical body portion 38 which is hollow and encloses a chamber or space 39. A barrel member 40 is screw threaded into the open end of the body 38 with a fluid pressure seal being formed by an annular seal 41. The barrel 40 has a series of longitudinal cylinder bores 42 concentrically arranged around a longitudinal axis of the fluid motor and in direct communication through passages 43 with the transmission lines 36. As previously mentioned, the number of transmission lines required for each receiver unit is dependent upon the receiver structure. Hence the cylinder bores 42 of the receiver will dictate the number of transmission lines. Pistons 44 slidably engage the cylinder bores 42 and have part spherical ends which work in contact with a reaction plate 45 rotatably guided on the wobble plate 46 by means of the balls 47. The wobble plate 46 has a shaft extension 48 which extends through the body 38 and is supported for rotation by the bearings 49 and sealed with relation to the body by means of the seal member 50. The opposite end of the shaft 48 is supported by a bushing 51 received in a recess in the wall of the barrel member 40. In addition to the transmission lines 36, the barrel 40 is also fitted with a reservoir drain line 52 which connects the internal portion of the motor with the reservoir 1 through a passage 53 to protect the rotating portion of the motor from the high pressure fluid of the system. As will be understood by those skilled in the art, the pistons 44 reciprocate within the bores 42 as the bores are sequentially connected to high and low pressure fluid to transmit the fluid pressure to the wobble plate for producing a torque which is transmitted through the shaft 48 to a driven load.

*Operation*

During operation, the pump 2 is driven constantly by the motor 5 to draw fluid from the reservoir 1 to maintain fluid pressure in the conduit 7, passage 23 and the high pressure chamber 26 of the valve at all times. The relief valve 8 may be adjusted to maintain a preset maximum fluid pressure in the line 7 which is to be made available to each receiver or drive motor 37 utilized. At the same time, the low pressure or exhaust chamber 27 of the transmitter 6 is in constant communication with the exhaust or return passage 31 through the passages 29 and 30 of the transmitter. The N number of transmission lines 24 and 36 connect the cylinder bores 42 of each receiver unit 37 with either the high pressure chamber 26 or the low pressure chamber 27 or, in some cases, the valve spool 17 may block a transmission line. When the valve spool of the transmitter unit is moved to a given position, some of the cylinder bores 42 of the receivers are connected to high and some to low pressure dictated by the position of the high and low pressure chambers of the valve spool. The fluid pressure within the bores 42 induces forces acting on the pistons 44 which in turn act on the incline plane of the reaction plate 45. These forces may be resolved into axial and transverse components. The axial components of the fluid forces are directly carried by the reaction plate and the transverse components act on a moment arm around the center of rotation of the wobble plate 46 to transmit a driving torque to the shaft 48. The sum of the transverse components make up the useful torque of the drive unit. As will be well understood by those skilled in the hydraulic motor arts, the principle axis of the wobble plate 46 constitutes a plane passing through the plate at its maximum inclination with respect to the axis of the shaft 48, as shown in FIG. 2. The torque generated by pistons acting on one side of the principal axis as viewed in FIG. 2 is opposed by the torque generated by pistons positioned on the opposite side of the axis. Only the net torque equal to the difference of the moments of the forces on each side of the principle axis then will be transmitted to drive the shaft 48. Thus rotation of the shaft is brought about by an unbalance in the forces acting on each side of the principle axis of the wobble plate. For any given position of the valve spool of the transmitter unit 6 which produces an unbalance in the forces acting on each side of the principle axis of the wobble plate, the wobble plate will rotate to a new position at which the forces are balanced on each side of the principle axis and this position will hold as long as the valve spool of the transmitter unit remains stationary. Thus it may be appreciated that rotation of the valve spool of the transmitter unit will reproduce a corresponding rotation in the shaft 48. From the system illustrated, it will be apparent that all of the receiver units 37 utilized will be correspondingly repositioned upon rotation of the transmitter valve spool in either direction. Thus the plurality of output shafts 48 of the receivers may be used to synchronize the positioning of a corresponding plurality of driven elements, within the torque capabilities of the receiver units. Although the average speed at which the output shafts of the various receivers will vary if the torque loads on the shaft vary, all of the shafts will bring the driven elements to a common position as long as the torque loads on the output shaft are within the torque capabilities of the receivers.

In order to prevent the dead heading or blocking of any one of the pistons of any of the receivers 37 by the blocking of any one of the passages 25 because of registry with the surface between the high and low pressure chambers 26 and 27 of the valve spool, the check valves 34 are provided between each of the passages 25 and the high pressure passage 23a. Thus the fluid in any blocked transmission line 24 may be dumped into the high pressure passage 23 to enable the wobble plate 46 to be moved to a new position of balance.

The advantages of the transmission system of the present invention are apparent from the fact that a positive synchronization of the positioning of one or a plurality of receivers, such as the drive units 37 located remote from the transmitter unit 6, may be obtained by the selective positioning of the shaft 18 of the transmitter unit by any low torque source of power including manual operation. It is also to be observed that the receiver units 37 may be designed for any torque capability without effecting the power required to position the transmitter unit. The fluid pressure in the system for driving the receivers 37 has no effect on the power required to position the transmitter and, likewise, leakage within the fluid pressure system, within limits, has no effect on accuracy since the transmitter 6 is a force transmitter rather than a displacement transmitter.

The system of the present invention has a wide range of application and use in industry or in any instance where the position of one or a plurality of elements at remote locations is desired and must be of a positive nature. Further advantages will be readily apparent to those familiar with the prior art devices of the character involved. While a specific wobble plate type hydraulic motor has been utilized in the present illustration, it will be appreciated by those skilled in the art that any equivalent receiver unit may be substituted as long as it performs the function described. Likewise, while a specific spool type valve has been used to demonstrate the principles of the invention, other types of valve units known to the prior art and suitable for the purpose described may be substituted without departing from the spirit of the present invention.

From the foregoing, it will be readily apparent to those skilled in the art that the present invention provides novel and useful improvements in fluid transmission systems of the character described. The arrangement and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. A fluid pressure transmission system comprising; a fluid motor having reciprocable pistons therein and a rotatable element driven by some of said pistons while returning others, a movable valve means having high and low fluid pressure chambers, conduit means for connecting the pistons of said motor to said valve means, and selectively operable drive means independent from said rotatable element for moving said valve means to sequentially connect said pressure chambers and said pistons for positioning said rotatable element in synchronized response to the positioning of said valve means.

2. A fluid pressure transmission system comprising; a plurality of fluid motors having reciprocable pistons therein and a rotatable element driven by some of said pistons while returning others, movable valve means having high and low pressure chambers, conduit means for connecting corresponding pistons of each of said motors to said valve means, and selectively operable drive means independent from said rotatable elements for moving said valve means to sequentially connect said pressure chambers and said pistons for positioning said rotatable elements in synchronism responsive to the positioning of said valve means.

3. A fluid pressure transmission system comprising in combination; a fluid motor having a drive element, said fluid motor including a stationary cylinder barrel having cylinder bores with pistons reciprocable therein and a rotatable cam plate connected to drive said drive element arranged to be driven by some of the pistons while returning others, a source of fluid pressure, a fluid reservoir, a rotatable valve means for effecting the distribution of fluid to the cylinder bores of said motor, said valve having portions defining high pressure and low pressure chambers, said high pressure chamber being connected to said pressure source and said low pressure chamber being connected to said reservoir, conduit means for connecting the cylinder bores of said motor to said valve, means independent of said motor for actuating said valve means to sequentially connect said pressure chambers and said cylinder bores, whereby the cam plate of said motor is rotated in synchronized response to the rotation of said valve means, and check valve means acting between said conduit means and said high pressure chamber, said check valve means permitting a relief of pressure from said conduit means to the high pressure chamber when the pressure in the conduit means exceeds the pressure in the high pressure chamber.

4. A fluid pressure transmission system comprising; a source of fluid pressure, a plurality of fluid pressure drive units, having output drive elements each of said drive units having a stationary barrel with pistons reciprocable therein and a rotatable cam plate connected to drive an associated drive element and arranged to be driven by some of the pistons while returning others, a fluid pressure transmitter unit comprising a rotary valve, said valve having a high pressure chamber and a low pressure chamber, conduit means connecting said pressure source to said high pressure chamber and a return conduit connecting said low pressure chamber with a fluid reservoir, a plurality of conduits connected to said valve, fluid pressure manifold means for connecting each of said plurality of conduits to ones of the pistons of corresponding said drive units, and drive means for selectively positioning said rotary valve for connecting some of said plurality of conduits to said high pressure chamber and others thereof to the low pressure chamber, whereby the drive element of each of said drive units will move in synchronism to a position corresponding to the position of said valve.

5. The system according to claim 2 wherein; said fluid motors are of the stationary cylinder barrel type having cylinder bores, said pistons being reciprocable therein, said rotatable element constituting a rotatable cam plate, and said valve means being rotatable to effect distribution of pressure fluid to the corresponding cylinder bores of each of said motors, and said drive means for moving said valve is independent of said motors.

6. The system according to claim 2 including, check valve means acting between said conduit means and said high pressure chamber, said check valve means permitting relief of pressure from said conduit means to the high pressure chamber when the pressure in the conduit means exceeds the pressure in the high pressure chamber.

7. The system according to claim 1 including; check valve means acting between said conduit means and said high pressure chamber, said check valve means permitting relief of pressure from said conduit means to the high pressure chamber when the pressure in the conduit means exceeds the pressure in the high pressure chamber.

References Cited

UNITED STATES PATENTS

| 1,804,921 | 5/1931 | Ellyson | 91—180 |
| 2,169,456 | 8/1939 | Wahlmark | 91—180 |
| 2,442,125 | 5/1948 | Gunning | 91—175 |
| 2,592,940 | 4/1952 | Monoyer | 91—327 |
| 2,985,147 | 5/1961 | Rockwell | 91—411 |
| 3,036,558 | 5/1962 | MacLeod et al. | 91—175 |
| 3,190,075 | 6/1965 | Ebert | 92—57 |
| 3,217,604 | 11/1965 | Knox | 91—391 |

MARTIN P. SCHWADRON, *Primary Examiner.*

PAUL E. MASLOUSKY, *Examiner.*